(No Model.)

W. B. VARDELL.
GRAIN SEPARATOR.

No. 309,810. Patented Dec. 23, 1884.

Witnesses.
A. Ruppert.
Edgar T. Gaddis.

Inventor:
W. B. Vardell
by J. R. Nottingham
atty.

UNITED STATES PATENT OFFICE.

WILLIAM B. VARDELL, OF CHARLESTON, SOUTH CAROLINA.

GRAIN-SEPARATOR.

SPECIFICATION forming part of Letters Patent No. 309,810, dated December 23, 1884.

Application filed April 18, 1884. (No model.)

*To all whom it may concern:*

Be it known that I, WILLIAM B. VARDELL, a citizen of the United States, residing at Charleston, in the county of Charleston and State of South Carolina, have invented certain new and useful Improvements in Grain-Separators, of which the following is a specification, reference being had therein to the accompanying drawings.

My invention relates to a fanning-mill or separator for rice or other similar produce; and the novelty consists in the construction, arrangement, and adaptation of parts, as will be more fully hereinafter set forth, and specifically pointed out in the claims.

The object of the invention is to provide a machine which will have peculiar means for vibrating the shoe, and novel means for separating the chaff and conveying the same to opposite sides of the machine, and which will be simple and efficient for the purpose described.

The invention is illustrated in the accompanying drawings, which form a part of this specification, and in which—

Figure 1:
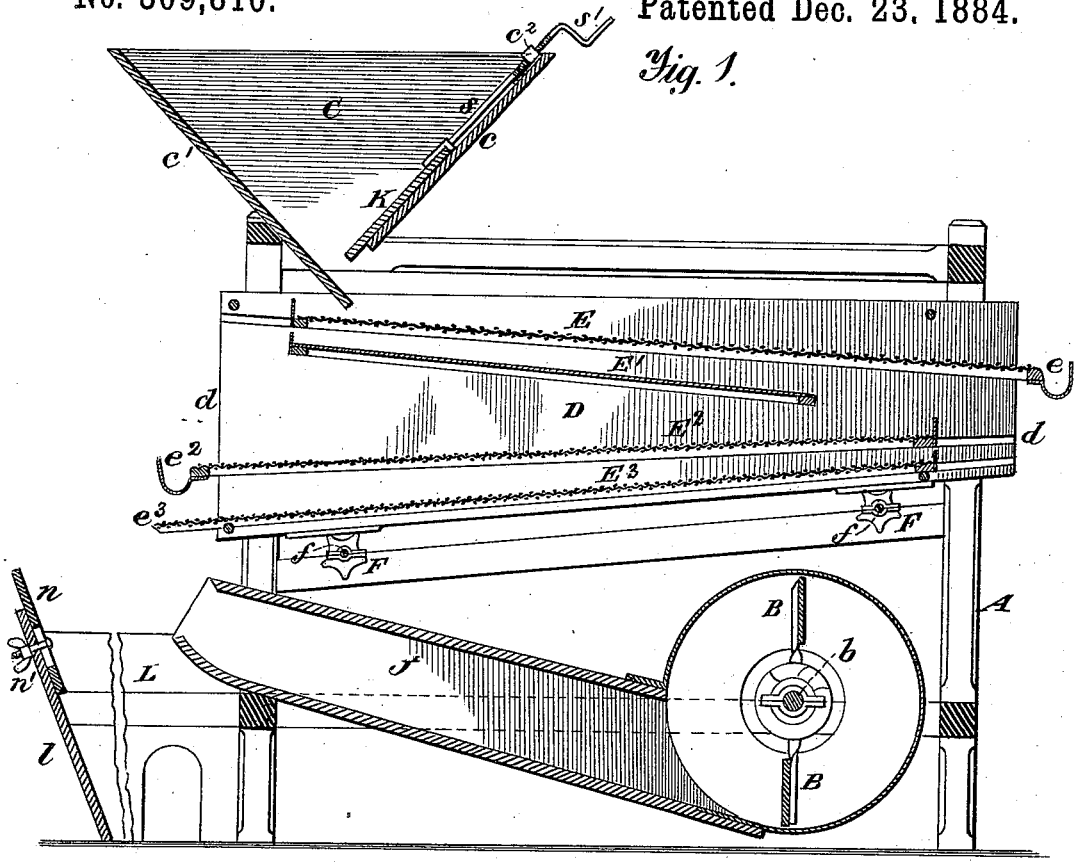
Figure 2:
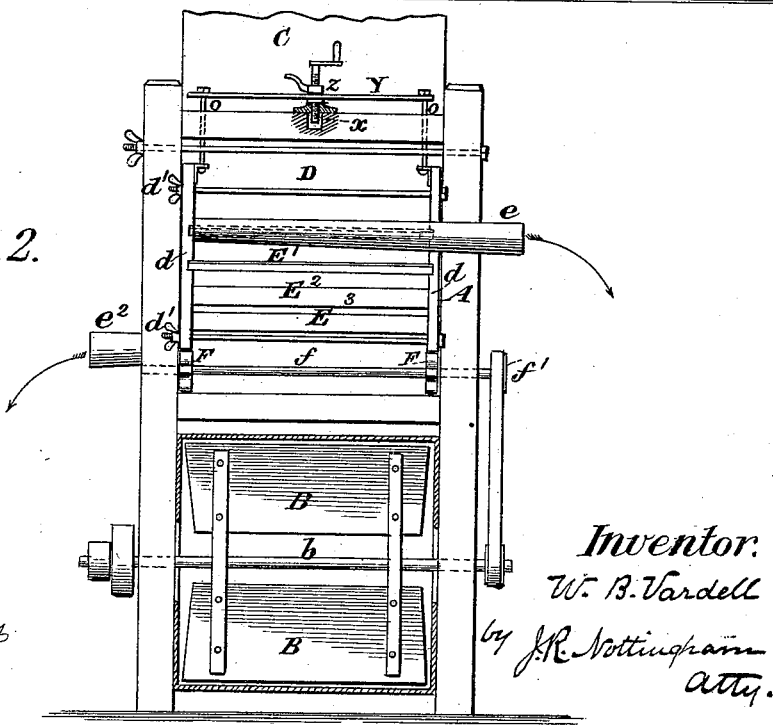

Figure 1 is a vertical longitudinal section of the entire device; Fig. 2, an end elevation, partly in section, showing the means for adjusting the vibrations of the shoe in relation to the cams.

Referring to the drawings, in which similar letters of reference indicate like parts in all the figures, A designates a frame, in the rear lower portion of which is journaled the shaft $b$ of the fan B, and in the front upper portion of which is the hopper C. A blast-chute, J, leads from the fan B toward the front of the machine, and beneath it, extending still farther to the front of the machine, is the grain-receptacle L.

D designates a vibrating shoe, having sides $d$, formed with grooves arranged in reverse inclines, which grooves receive screens E E², &c., the whole being held together by rods and thumb-nuts $d'$. The hopper C has one side formed with an incline, $c'$, the lower portion of which extends forward well over the upper and coarser screen, E, of the shoe D, the opposite side being formed with an incline, $c$, in the opposite direction. A sliding plate, K, operated by a threaded rod, $s$, working through a threaded lug, $c^2$, and provided with a crank-handle, $s'$, serves to adjust the amount of feed at will. The upper screen, E, is of coarse mesh, and is adapted to carry the hulls, unthrashed grain, &c., to the rear of the machine, and it is provided with a trough, $e$, which inclines to one side of the machine, where it deposits the hulls, &c. This screen E allows the rice or other grain to fall through on the inclined board E'. This board E' carries the grain forward and deposits it by gravity upon the screen E², which is inclined in the opposite direction—that is to say, inclined so as to allow the grain to gravitate to the front of the machine—and it is provided with an inclined trough, $e^2$, the function of which is similar to that of the trough $e$. This screen E² carries off the hulls, &c., but allows the grain to fall through on the screen E³, which allows the dust, &c., to gravitate through to waste, but has an extension, $e^3$, which carries the grain to the front of the machine and deposits it in the receptacle L. In its descent from the screen E³ to the receptacle L the grain passes across the path of the blast through the chute J, which blast is adapted to further clean the grain from dust and chaff. The force of the blast throws the grain against the inclined side $l$ of the receptacle L, and this side $l$ is provided with an extension, $n$, which may be adjusted by a thumb-nut, $n'$, to any desired height to accommodate the strength of the blast. The shoe is made to vibrate by means of toothed wheels F, hung upon the shafts $f$, which shafts are journaled in the frame A, and one of which, by a pulley, $f'$, is belted to a pulley upon the shaft of the fan and operated by the same power. The other shaft $f$ may be similarly belted to the fan-shaft or to the first-named shaft $f$, or in any other suitable manner which will give the wheels F the desired motion. The teeth of the wheels F are so arranged as to give a proper stroke to the shoe, and are sufficient in number to give several vibrations with one revolution of the shafts $f$.

Y designates a horizontal spring-bar, to the ends of which are hung the rods $o$, which support the shoe. By means of a threaded rod, $x$, and a jam-nut, $z$, this spring-bar Y may be adjusted to vary the amount of each vibration.

The arrangement of the parts $x$, Y, $z$, and $o$ (shown in Fig. 2) will be understood to be similar at both ends of the machine—that is to say, the shoe is supported at each end by the rods o and spring-bar Y, and each bar Y is adjusted by means of the parts x z.

The operation of the machine is obvious.

What I claim as new is—

1. A separator comprising the screen E, inclined toward the rear of the machine, and having transverse trough e, inclined to one side, the screen E², inclined in the opposite direction, and having transverse trough e², the inclined board E', arranged to have its lower end over the screen E², the screen E³, having extension e³, the receptacle L, chute J, and the fan, all operating as and for the purposes set forth.

2. The combination, with the toothed wheels F, the fan-shaft, driving belts, and pulleys, of the shoe, as described, the spring-bars Y, screws x, and jam-nuts z, all arranged and serving as and for the purposes set forth.

In testimony whereof I affix my signature in presence of two witnesses.

WILLIAM B. VARDELL.

Witnesses:
THOS. E. WATSON,
E. M. BAILEY.